United States Patent [19]

Perlman et al.

[11] Patent Number: 5,773,091
[45] Date of Patent: Jun. 30, 1998

[54] ANTI-GRAFFITI COATINGS AND METHOD OF GRAFFITI REMOVAL

[75] Inventors: Daniel Perlman, Arlington, Mass.; Robert H. Black, New Rochelle, N.Y.

[73] Assignee: Brandeis University, Waltham, Mass.

[21] Appl. No.: 680,265

[22] Filed: Jul. 11, 1996

[51] Int. Cl.$^6$ ........................................................ B05D 3/00
[52] U.S. Cl. ............................................ 427/384; 427/154
[58] Field of Search .................................. 427/154, 155, 427/416, 352, 384, 353, 336

[56] References Cited

U.S. PATENT DOCUMENTS

| | | | |
|---|---|---|---|
| 1,787,338 | 12/1930 | Clapp . | |
| 2,260,882 | 10/1941 | Berg et al. . | |
| 3,102,038 | 8/1963 | Fisher . | |
| 4,098,925 | 7/1978 | Rasmussen | 427/154 |
| 4,315,957 | 2/1982 | Hereh et al. | 427/155 |
| 4,349,586 | 9/1982 | Sejoumant | 427/154 |
| 4,442,140 | 4/1984 | Kawabata et al. | 427/154 |
| 4,780,235 | 10/1989 | Jackson | 252/170 |
| 4,836,950 | 6/1989 | Madsen | 252/153 |
| 5,024,780 | 6/1991 | Leys | 252/162 |
| 5,049,186 | 9/1991 | Kawabata | 106/2 |
| 5,143,949 | 9/1992 | Grogan | 427/155 |
| 5,246,495 | 9/1993 | Helmstetter | 106/600 |
| 5,308,648 | 5/1994 | Prince et al. | 427/212 |
| 5,330,788 | 7/1994 | Roberts | 427/154 |
| 5,387,434 | 2/1995 | Black | 427/154 |
| 5,418,006 | 5/1995 | Roth et al. | 427/155 |

FOREIGN PATENT DOCUMENTS 05093164   4/1993   Japan .

9419414   9/1994   WIPO .

OTHER PUBLICATIONS

AGP–Wipe Away®Industrial Paint Remover & Stripper Information Sheet and Specifications, AGP Surface Control Systems, Inc., Windham, New York (no date).
Solvent Description (Source unidentified, no date).
Piranha I Product Data, Fiberlock Technologies, Inc., Cambridge, MA (No date).
*Encyclopedia of Chemical Technology*, vol. 19, 3rd edition, Kirk–Othmer, John Wiley & Sons, New York, pp. 251, 267 (1982) (No month).
*Encyclopedia of Chemical Technology*, vol. 24, 3rd edition, Kirk–Othmer, John Wiley & Sons, New York, pp. 466–481 (1982) ( No Month).

*Primary Examiner*—Diana Dudash
*Attorney, Agent, or Firm*—Lyon & Lyon LLP

[57] ABSTRACT

A method for removing soiling and graffiti markings from a barrier coat previously formed on an underlying surface is provided, wherein the method preserves rather than sacrifices the barrier coat. The method includes applying a solvent system which includes at least one substantially non-toxic organic solvent such as 1-methyl-2-pyrrolidinone to an area of the barrier coat. A method is also provided to improve the resistance of a protective barrier coat to graffiti markings and other soiling over time and thereby facilitate any necessary cleaning of this barrier coat. The improvement in the case of wax coatings is achieved by including in the wax, at least one protective chemical agent selected from the group consisting of wax-soluble/water-insoluble UV light absorbers, wax-soluble/water-insoluble free-radical and peroxy-radical scavengers, and wax-soluble/water-insoluble wax antioxidants.

18 Claims, 3 Drawing Sheets

| nm | ABS |
|---|---|
| 450.0 | -0.001 |
| 440.0 | -0.005 |
| 430.0 | -0.011 |
| 420.0 | -0.016 |
| 410.0 | -0.020 |
| 400.0 | -0.018 |
| 390.0 | 0.031 |
| 380.0 | 0.261 |
| 370.0 | 0.530 |
| 360.0 | 0.761 |
| 350.0 | 0.904 |
| 340.0 | 0.851 |
| 330.0 | 0.698 |
| 320.0 | 0.670 |
| 310.0 | 0.801 |
| 300.0 | 0.842 |
| 290.0 | 0.633 |
| 280.0 | 0.422 |
| 270.0 | 0.221 |
| 260.0 | 0.104 |

| nm | ABS |
|---|---|
| 450.0 | -0.001 |
| 440.0 | -0.007 |
| 430.0 | -0.013 |
| 420.0 | -0.019 |
| 410.0 | -0.023 |
| 400.0 | -0.016 |
| 390.0 | 0.079 |
| 380.0 | 0.488 |
| 370.0 | 0.982 |
| 360.0 | 1.432 |
| 350.0 | 1.848 |
| 340.0 | 1.664 |
| 330.0 | 1.296 |
| 320.0 | 1.253 |
| 310.0 | 1.565 |
| 300.0 | 1.754 |
| 290.0 | 1.245 |
| 280.0 | 0.770 |
| 270.0 | 0.351 |
| 260.0 | 0.156 |

ANTI-GRAFFITI COATINGS AND METHOD OF GRAFFITI REMOVAL

BACKGROUND

This invention relates to improved anti-graffiti and anti-soiling coating materials for protection of interior and exterior surfaces of buildings and other structures, and improved materials and methods for removing graffiti and soiling from these coated and protected surfaces.

There has been increasing concern in recent years over the costly damage caused by graffiti. As pointed out by Black in U.S. Pat. No. 5,387,434, (hereby incorporated by reference herein) it is particularly difficult to remove graffiti paint, permanent ink and other marking materials embedded in porous surfaces such as concrete block, limestone and wood. A background to the graffiti problem, and complications involved in removing graffiti from painted and unpainted surfaces is provided by Black in the prior patent as follows:

In attempting to cope with the graffiti problem, much emphasis has been placed on cleaning techniques for use in treating surfaces to remove graffiti. A common technique is to apply a coating of paint remover, such as methylene chloride, benzene or toluene. After the coating sits for awhile, it is removed by power washing. This process may be repeated two to four times. Any graffiti residue is then removed by sandblasting or sanding, which may require refinishing of the surface to restore it to its former appearance. Another technique for coping with graffiti is to simply repaint the surface, which is disadvantageous because of the time and expense involved. The use of paint removers is disadvantageous and results in the release of harmful vapors which are detrimental to both health and environment. In addition, paint removers tend to soften and remove the underlying paint.

Specialized cleaning compositions have been developed for removing graffiti. Examples of such cleaning compositions are disclosed in U.S. Pat. No. 5,024,780 to Leys. These cleaning compositions are designed for graffiti removal and not as anti-graffiti coatings. Anti-graffiti protectants for use as protective coatings have also been developed. These protectants have not proved satisfactory for several reasons: they are not effective against all types and colors of graffiti; they are expensive to manufacture; they are difficult to apply, usually requiring clean, oil-free and dry surfaces; they cannot be applied to painted surfaces; and they are environmentally unfriendly, often having high volatile organic content.

To overcome the above-described problems, Black describes several anti-graffiti protective coating compositions containing, principally, either microcrystalline wax, sodium silicate, or combinations of the wax and sodium silicate. The wax-containing compositions are water-resistant and preferred for outdoor use, while the slightly water-soluble sodium silicate barriers are very useful for indoor use. Methods for applying these coatings and for subsequently removing graffiti from the protected surfaces are also described by Black. In brief, water-based coatings, substantially free of organic solvents are applied, and cleaning is accomplished using pressurized heated water to wash away the graffiti together with a portion of the protective coating. In the case of sodium silicate coatings, the silicate barrier tends to dissolve in the heated water as the graffiti is removed, while a wax barrier tends to soften and melt in the water, thereby carrying away the applied graffiti. Protective coatings containing a mixture of microcrystalline wax and sodium silicate in various proportions, or alternatively, a wax layer applied over a sodium silicate layer were also formulated and successfully tested by Black. Paint and permanent marker graffiti were again successfully removed by washing with water heated to a temperature of between approximately 120° and 190° C., and applied with a pressure of at least 250 psi. Using this method, following several rounds of graffiti application and removal, Black has found that the sacrificial protective coating of silicate or wax must be re-applied to preserve the integrity of the graffiti barrier.

There is an extensive literature on methods which are useful for producing, applying and removing temporary protective coatings such as the microcrystalline wax and silicate coatings used in the present invention. For example Clapp, U.S. Pat. No. 1,787,338, discloses methods for producing wax dispersions in solutions of sodium silicate useful for waterproofing surfaces. Berg, U.S. Pat. No. 2,260,882, describes a protective coating for interior wall surfaces, in which bentonite and vegetable gum are applied in water, and the resulting coating can be later stripped away by simple washing. Fisher, U.S. Pat. No. 3,102,038 describes a temporary protective coating for metal surfaces, in which a film consisting of particles of sodium silicate in a binder is readily applied in a water solution, and subsequently removed by washing or steam cleaning. Hereth et al., U.S. Pat. No. 4,315,957 describe the use of an aqueous emulsion of hydrocarbon wax to form a temporary waterproof protective coating for metal and lacquered surfaces, in which a water-steam mixture is used to remove the coating. Sejournant, U.S. Pat. No. 4,349,586 describes application of a protective and/or anti-graffiti coating containing at least one wax such as microcrystalline wax and silicone oil dissolved in an organic solvent. Graffiti, together with the dried wax coating, are removed by means of a paint stripper or jet of hot pressurized water whose temperature exceeds the melting point of the wax. Kawabata, U.S. Pat. No. 5,049,186 describes solvent-free water-based wax emulsions containing an emulsifier and a dispersed phase including petroleum wax, an oxygen-containing wax, an ethylene/a-olefin, a fatty acid, and other constituents which may include antioxidants and ultraviolet absorbers. The coatings form waterproof, environmentally resistant protective barrier films which can be removed with kerosene-containing warm water. Helmstetter, U.S. Pat. No. 5,246,495 describes a waterproofing coating for cement surfaces, including sodium silicate, a surfactant, and an aqueous solution containing a polysiloxane.

In the prior art there is very little teaching on selectively removing graffiti, paint, ink and the like from a protective barrier surface consisting principally of wax, sodium silicate, or combinations thereof, without removing the barrier itself. The reason for this lack of information is that the wax or silicate barrier is considered a sacrificial material, and dissolving or melting the underlying barrier is considered the easiest method to eliminate the graffiti. In Leys, U.S. Pat. No. 5,024,780, a cleaning composition for graffiti removal is described containing 1-methyl-2-pyrrolidinone, propylene carbonate, and thickening and dispersing agents. Leys proposes that the disclosed cleaning composition can remove graffiti without damaging an underlying protectively-coated surface. Applicant has obtained a sample of a commercial product known as "PGR" (manufactured by A.G.P. Systems, Inc., Windham, N.Y.) which is constituted according to the Leys patent. This product has been tested for its ability to remove paint and ink graffiti applied to the wax and sodium silicate graffiti barriers described in Black, U.S. Pat. No. 5,387,434. While the PGR product removed the graffiti, it also removed the graffiti barriers of Black. Similarly, Valasek, U.S. Pat. No. 4,664,721 discloses a printing screen cleaner which contains 1-methyl-2-pyrrolidinone, an oxygenated solvent such as cyclohexanone, and a surfactant. This cleaner dissolves waxes and is therefore not useful in the present invention. Similarly, Jackson et al., U.S. Pat. No. 4,780,235 describe a paint remover and Madsen, U.S. Pat. No. 4,836,950 describes a cleaner for printing inks which contain 1-methyl-2-pyrrolidinone and a number of other constituents which are known to dissolve waxes. Because the compositions described in these patents dissolve waxes, these compositions are not likely to be useful in the present invention.

SUMMARY OF THE INVENTION

This invention features methods for selectively removing graffiti from microcrystalline wax and sodium silicate-containing anti-graffiti barrier coats such as those of Black, U.S. Pat. No. 5,387,434 without damaging the barriers themselves. The invention further features improved coating materials, providing more durable and readily cleanable barriers which are not sacrificed during the graffiti removal process.

In a first aspect, the invention features a method for removing soiling and graffiti markings from a barrier coat on an underlying surface, comprising the steps of applying a solvent system to an area of the barrier coat wherein the solvent system contains a functionally effective concentration of at least one substantially non-toxic organic solvent which softens or dissolves the soiling and graffiti markings without substantially dissolving the barrier coat, and removing the soiling and graffiti markings by a mechanical means.

By "graffiti" it is meant any unwanted marking formed on a surface. Such a marking is made by painting, drawing, lettering or any other means. Graffiti is typically applied using paints, usually applied by spray cans, or markers. The paints are typically oil-based paints including enamels, epoxies, lacquers and urethanes. The markers are typically color markers having pigmented dyes with fast drying solvents. See, Black, U.S. Pat. No. 5,387,434. Graffiti can also be made by pencil, crayon, lipstick, pen, or any other similar marking device. By "soiling" it is meant any markings made by such sources as air-borne soot and smoke, rain-carried contaminants, airborne radioactive particles, grease residues, human hand contact, shoe rubber contact, tire rubber contact, or other similar sources.

By "barrier coat" it is meant a coat on an underlying surface formed from a coating material which protects the underlying surface from penetration by graffiti markings and soiling. Preferably, the coating material used to form the barrier coat is substantially free of toxic organic solvents. More preferably, the coating material comprises water and at least one member selected from the group consisting of mineral waxes, synthetic waxes, and silicates, wherein said member is present in the coating material in an amount sufficient to form a substantially adherent and continuous barrier coat against penetration by graffiti markings to said underlying surface. More preferably, the barrier coat is one which is described by Black in U.S. Pat. No. 5,387,434. Surfaces treated with said coating material to form the barrier coat can be selected from the group consisting of painted and unpainted, porous and non-porous, concrete, brick, stone, metal, wood and plastic surfaces.

By "solvent system" it is meant a solvent or mixture containing one or more solvents which disolves and/or soften graffiti markings or soiling. Preferably, the solvent system contains a functionally effective concentration of at least one organic solvent. It is prefered that the solvent be substantially non-toxic. It is also prefered that the solvent system contains a dipolar aprotic organic solvent, such as described below. The solvent system may also contain one or more diluents, and/or thickening agents, as described below.

By "preserving rather than sacrificing said barrier coat" or "without substantially dissolving said barrier coat" it is meant that the solvent system does not significantly remove the barrier coat from the underlying surface. The extent of removal can be determined by visual examination and/or determination of water repellancy. Preferably, the coating material used to form the barrier coat (e.g., mineral waxes, synthetic waxes, or silicates) is not soluble or is only slightly soluble in the solvent system.

By "applying" it is meant contacting the surface having a barrier coat with the solvent system by means known to those in the art. Such means of applying include, but are not limited to, spraying, applying by brush, or applying by roller.

By "mechanical means" it is meant the use of at least a slight amount of physical force in the removal of the graffiti or soiling. Such mechanical means can include rubbing, brushing, wiping, the use of aqueous pressurized spray washing with high or low pressure at high, low, or ambient temperature, cleaning by compressed air, or any other known means.

This invention is based upon Applicants' recent and surprising discovery that a dipolar aprotic organic solvent, 1-methyl-2-pyrrolidinone (abbreviated MPD hereinafter), and to some extent, 2-pyrrolidinone (abbreviated PD hereinafter) could selectively remove graffiti, including oil-based paints and permanent marker inks from both micro-crystalline wax emulsion coatings and sodium silicate-based graffiti barriers as described by Black, without dissolving or removing any substantial amount of the barriers themselves. The cleaned barrier coatings appeared intact and structurally unaltered so that they could continue to provide graffiti protection without the need to re-coat the underlying surface.

While MPD is a known constituent of paint removal products for architectural surfaces, the observation of selective graffiti removal from wax and sodium silicate surfaces was particularly unexpected for several reasons. First, it was believed and stated by Black in U.S. Pat. No. 5,387,434 that the wax or sodium silicate-based protective coating "chemically reacts with the graffiti paint and alters its setting properties. To remove the graffiti, the surface is power washed with pressurized, heated water, as described above."

Applicants tested the solubility of the individual micro-crystalline wax and sodium silicate components of the barriers in MPD and obtained the surprising result that MPD dissolved neither barrier component. Therefore, these barrier components which were thought by Black to be chemically mixed with the graffiti, were expected to protect the graffiti against removal by MPD. However, in contrast to the insolubility of these barrier components in MPD reported above, Applicants also observed that the MPD-containing graffiti removal composition of Leys, U.S. Pat. No. 5,024,780, did remove the same wax barriers and turned the sodium silicate-containing barriers described by Black white. These somewhat contradictory observations suggested that MPD might be unsuitable for selectively removing graffiti from the barriers described by Black. Indeed, one or more components of these barriers applied from an aqueous emulsion medium, might be attacked by MPD despite the fact that MPD did not dissolve the pure wax or sodium silicate.

In addition to being an effective cleaning agent for graffiti and soiling, the organic solvent, MPD is considered chemically unreactive and stable, and environmentally "friendly," being biodegradable, much less toxic than typical organic solvents, and substantially non-volatile (boiling point of 396° F.). It does not appear to be a skin-sensitizing agent, but the eyes must be protected against its contact irritancy (see "Pyrrole and Pyrrole Derivatives" by Hort and Anderson, in Encyclopedia of Chemical Technology, 3rd ed., Vol. 19, pp. 510–520). Its use, or the use of an equivalently selective graffiti-solubilizing agent, e.g., pyrrolidinone, which preserves the integrity of the graffiti barrier is an important component of the present invention. Furthermore, as utilized in the present invention, MPD allows the ambient temperature removal of graffiti from the above-described graffiti barriers using simple mechanical means such as wiping, or using ambient temperature water washing, whereas previously, pressurized hot water and/or steam were required for the cleaning process.

Using the MPD-based cleaning system, the discovery that graffiti in practical terms, can be functionally separated and removed from the wax and/or sodium silicate protective barriers, allowed Applicants to re-evaluate these barrier coating structures and compositions. That is, if graffiti could be selectively removed leaving the protective barrier intact, the barrier could now be considered a more permanent barrier, rather than a sacrificial barrier being dissolved and/or melted away with hot water following graffiti application. Accordingly, Applicants have developed new graffiti barrier compositions to improve the graffiti-resistance and ease of cleaning of the silicate and wax-based barriers based upon the MPD-containing cleaning system described above.

Thus, in a further aspect, the invention includes an improved method of treating surfaces to increase the resistance of the surfaces over time to graffiti markings and other soiling, and facilitating cleaning of the surfaces, wherein the method comprises the steps of applying a coating material to a surface to form thereon a barrier coat, wherein the coating material comprises water, and at least one constituent selected from the group consisting of mineral waxes and synthetic waxes, wherein the improvement comprises inclusion in the coating material of an effective concentration of at least one wax-protective chemical agent selected from the group consisting of wax-soluble/water-insoluble UV light absorbers, wax-soluble/water-insoluble free-radical and peroxy-radical scavengers, and wax-soluble/water-insoluble wax antioxidants.

In a further aspect, the invention includes an improved method of treating indoor surfaces to increase resistance to graffiti markings and other soiling, and facilitate cleaning of said treated surfaces, wherein the method comprises the steps of applying a coating material to a surface to form thereon a barrier coat, wherein said coating material is substantially free of toxic organic solvents and comprises water and at least one constituent selected from the group consisting of sodium silicate, precipitated silicic acid, and synthetic amorphous silica, said constituent being present in the coating material in an amount sufficient to form a substantially continuous and adherent barrier against soiling and graffiti penetration to any underlying surface, wherein the resistance to graffiti and ability to remove graffiti markings and/or soiling over time is improved by including in said coating material, a practical and effective concentration of at least one surfactant compatible with aqueous silicate emulsions, said surfactant being selected from the group consisting of anionic and non-ionic surfactants.

In brief, (i) for the sodium silicate coatings, the addition of improved aqueous emulsion surfactants, and (ii) for the wax emulsion coatings, the addition of wax-protecting agents (wax-soluble/water-insoluble) into the wax phase of the emulsion (including UV-absorbing agents, hindered amine free-radical/peroxy-radical scavenging agents, and antioxidant agents) improves graffiti-resistance over time, and facilitates cleaning over a period of time, of graffiti from these barrier coats.

Other features and advantages of the invention will be apparent from the following description of the preferred embodiments, and from the claims.

DESCRIPTION OF THE PREFERRED EMBODIMENTS

Figure 1:
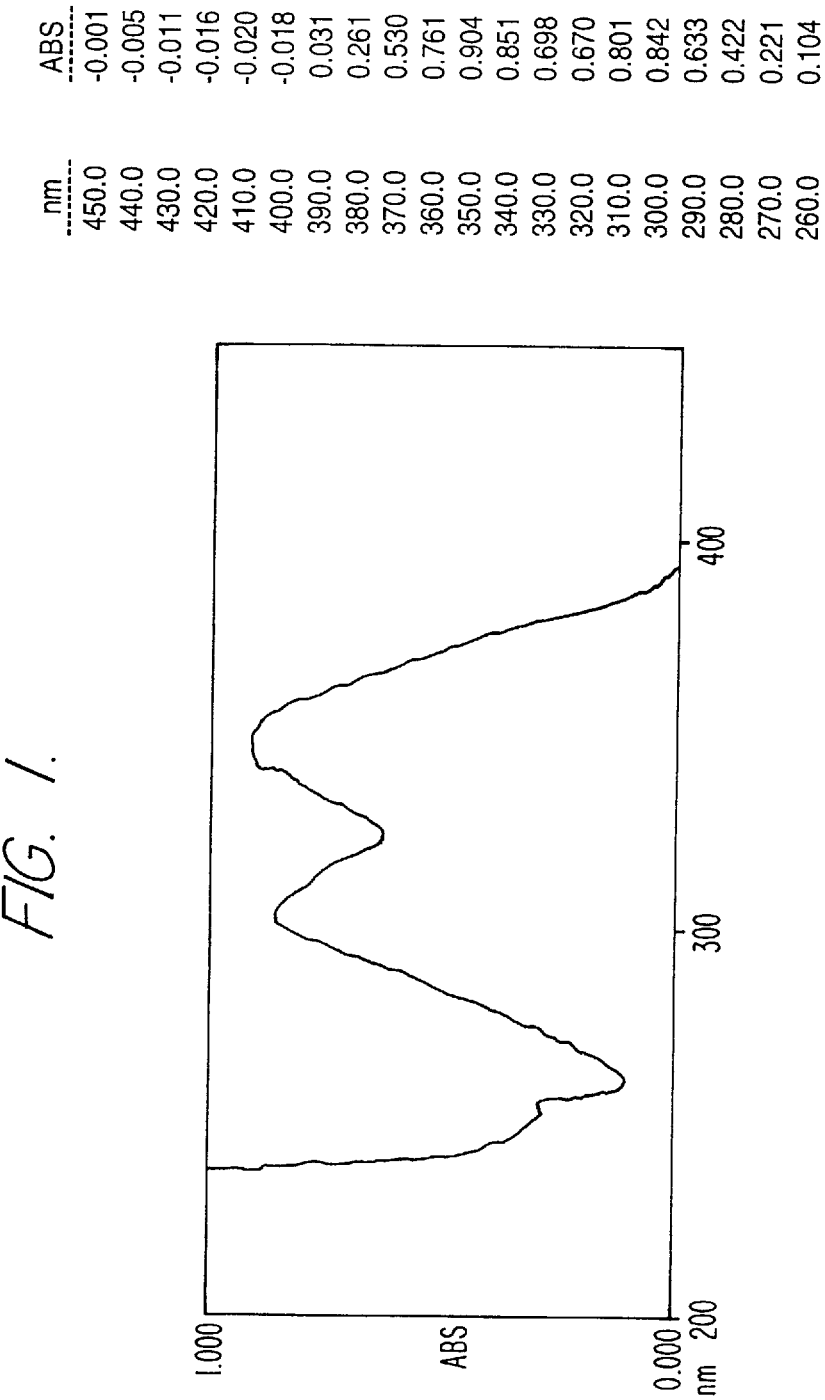
FIG. 1: A 15 micron sample coating of microcrystalline wax containing 1% (w/w) Tinuvin 328 (plus HALS and AO as described above) was scanned versus a reference coating (20 micron coating of the unmodified microcrystalline wax).

According to the present invention, Applicants have developed an improved method for removing soiling and graffiti markings comprising paint and/or marking ink from a barrier coat previously formed on an underlying surface. The barrier coat is formed from a coating material substantially free of toxic organic solvents. The coating material includes water and at least one member selected from the group consisting of mineral waxes, synthetic waxes, and silicates. The member is present in the coating material in an amount sufficient to form a substantially adherent and continuous barrier against penetration by graffiti markings to the underlying surface. The improved cleaning method preserves rather than sacrifices the barrier coat, and involves applying a solvent system to an area of the barrier coat to be cleaned, the solvent system containing a functionally effective concentration of at least one substantially non-toxic organic solvent which can soften or dissolve the graffiti markings and/or the soiling without substantially dissolving the barrier coat. The softened and/or dissolved graffiti markings and/or soiling are removed by mechanical means.

The solvent system may be applied to the graffitied or soiled area by spraying or applying by brush or roller. The physical means of removing the softened or dissolved graffiti markings and/or the soiling is selected from the group consisting of brushing, wiping, aqueous pressurized spray washing, and cleaning by compressed air.

Preferably, the organic solvent is selected from the group consisting of 1-methyl-2-pyrrolidinone (abbreviated MPD)

and 2-pyrrolidinone. Although the effective concentration of MPD may range from 20% to 100% by weight, the preferred concentration of MPD in the solvent system ranges between approximately 40% and 60% by weight. The solvent composition containing 1-methyl-2-pyrrolidinone and/or 2-pyrrolidinone also preferably includes at least one diluent such as propylene glycol or ethylene glycol and/or a co-solvent. The co-solvent can be substituted for a portion of, or all of the diluent, and serves to speed graffiti removal, e.g., the natural terpene solvent, e.g., limonene, can be used as a co-solvent. Depending upon the requirements for graffiti removal, limonene is typically added at a concentration ranging from 5% to 50% weight/volume, and preferably at a concentration ranging from 10% to 25% weight/volume. In addition, the solvent system may include a thickening agent such as hydroxypropylcellulose e.g., Klucel® H, at a concentration ranging from 0.25% to 3% by weight, but preferably at a concentration ranging from 0.5% to 2% by weight. The solvent system also preferably includes a non-ionic detergent such as octoxynol, e.g., Triton X-100, added to the system at a concentration ranging from approximately 1% to 20% by weight.

For purposes of reference, the method and composition are provided for constituting (i) the original wax, and (ii) the original sodium silicate graffiti barriers of Black, U.S. Pat. No. 5,387,434. A preferred composition for constituting the wax barrier coating of Black known as G PRO® coating is as follows: An aqueous wax emulsion concentrate known as PTGM 1303 concentrate is purchased from Hercules, Inc. (Paper Technology Division, Wilmington, Del.). This concentrate contains approximately 48% by weight solids, including approximately 43% by weight petroleum hydrocarbon microcrystalline wax having a melting point of 165°–170° F., and approximately 5% by weight of a proprietary non-ionic surfactant. To make 100 gallons (826 pounds) of the original and preferred G PRO® wax coating material (density=8.26 pounds/gallon), the following are combined:

274 pounds PTGM 1303 concentrate (obtained from Hercules, Inc.)

6 pounds Natrosol 250 MBR thickener (hydroxyethylcellulose, CAS No. 9004-62-0, (obtained from Aqualon Division of Hercules, Inc., Wilmington, Del.)

1 pound Troysan 174 preservative- 2[(hydroxymethyl) amino] ethanol, 97% content by weight (obtained from Troy Chemical Co., Newark, N.J.)

545 pounds (68 gallons) water diluent The percentages by weight for the constituents in this G PRO® formulation are approximately 14% wax, 1.7% surfactant, 17% aqueous carrier for wax, 0.7% thickener, 0.12% preservative, 66% water diluent. The range of useful concentrations (% by weight) in this G PRO® formulation are approximately 5–30% wax, 0.5–3.0% surfactant, 0.25–2.0% thickener, 0.05–0.2% preservative, with the balance being aqueous. In the present invention, as is explained below, the wax composition described above is modified by addition of UV absorber, free-radical and peroxy-radical scavenger, and antioxidant to the microcrystalline wax component of PTGM 1303.

For constituting the original and typical sodium silicate-based G PRO® coating designed for indoor use as previously described by Black, the following are combined:

85% by volume Sodium silicate, Type O (obtained from the PQ Corp., Valley Forge, Pa.)

15% by volume water

Although a preferred indoor G PRO® coating composition contains approximately 85% by volume sodium silicate, the useful concentration ranges between approximately 10–95% by volume. Preferably, the sodium silicate has the following specifications: weight ratio of $SiO_2:Na_2O$ is 3.22:1, density is 42.2 degrees Baume, the pH is 11.3 and the viscosity is 400 centipoise.

In the present invention, as explained below, the above composition is preferably modified by addition of an anionic surfactant. A preferred anionic surfactant is known as Dowfax 1A manufactured by Dow Chemical Corp. or Niaproof Anionic Surfactant 08 manufactured by the Niacet Corp. and is used within a concentration range of approximately 0.1–3.0% by weight (final concentration), and preferably within the range of 0.25–0.75% by weight. This anionic surfactant is also known chemically as sodium ethylhexyl sulfate (sulfuric acid, mono(2-ethylhexyl) ester), CAS No. 126-92-1 and contains sodium chloride.

Applicants proceeded to test various components in the composition of Leys, U.S. Pat. No. 5,024,780. In an initial experiment, propylene carbonate (two drops) was placed on sodium silicate and microcrystalline wax barrier coatings of Black as described above, and in Examples 1 and 4 respectively, of U.S. Pat. No. 5,387,434. After two minutes the liquid was wiped off with a paper towel. Propylene carbonate was found to entirely remove the wax barrier coating, while the sodium silicate film was altered to a white coating. Therefore propylene carbonate is an undesirable constituent with respect to preserving the structure of the barriers. In addition, several of the dispersing agents named in the formulation of Leys (such as dipropylene glycol methyl ether) are known to dissolve hydrocarbon waxes and would be undesirable constituents in the present invention in which persistence of wax barriers is required. Finally, the MPD component was found to be necessary and sufficient without propylene carbonate for removing graffiti and cleaning the barriers of Black without removing, damaging, or otherwise altering them.

Also according to the present invention, Applicants have developed an improved method of treating an indoor or outdoor surface to increase the resistance over time of these treated surfaces to graffiti markings and other soiling, and facilitating any necessary cleaning of said treated surfaces. The method includes applying a coating material to a surface to form thereon a dried barrier coat. The coating material is substantially free of toxic organic solvents and includes water. The coating material and the dried barrier coat include at least one constituent selected from the group consisting of mineral waxes and synthetic waxes. The constituent is present in the coating material in an amount sufficient to form a substantially continuous and adherent barrier against soiling and graffiti penetration to any underlying surface. The resistance to graffiti and ability to remove graffiti markings and/or soiling over time is improved by including in the coating material, a practical and effective concentration of at least one wax-protective chemical agent selected from the group consisting of wax-soluble/water-insoluble UV light absorbers, wax-soluble/water-insoluble free-radical and peroxy-radical scavengers, and wax-soluble/water-insoluble wax antioxidants.

Similarly, Applicants have improved upon the silicate-based protective barrier coat. The silicate-based protective barrier coat is preferably used to protect an indoor surface from graffiti markings and other soiling, and facilitating any necessary cleaning of such a surface. Preferably, the method includes applying a coating material to a surface to form thereon a dried barrier coat. In a further preferred embodiment, the coating material is substantially free of toxic organic solvents and includes water, and the dried barrier coat includes at least one constituent selected from the group consisting of sodium silicate, precipitated silicic acid, and synthetic amorphous silica. The constituent is present in the coating material in an amount sufficient to form a substantially continuous and adherent barrier against soiling and graffiti penetration to any underlying surface. The resistance to graffiti and ability to remove graffiti markings and/or soiling over time is improved by including in the coating material, a practical and effective concentration of at least one surfactant compatible with aqueous silicate emulsions, the surfactant being selected from the group consisting of anionic and non-ionic surfactants.

With respect to the prior art, while there are a number of references describing the use of chemical additives for improving the stability and durability of wax products and wax coatings, little information is available on maintaining graffiti resistance on a wax or sodium silicate surface. Waxes are typically substances which are plastic solids at room temperature and liquids at moderately elevated temperature. Many, but not all waxes are insoluble in water and water repellant, including animal wax (e.g., beeswax), vegetable wax (e.g., carnauba), mineral wax (principally petroleum hydrocarbon wax which includes the three subgroups- paraffin wax, microcrystalline wax, and semimicrocrystalline wax), and synthetic waxes including polyethylene waxes, Fisher-Tropsch waxes, chemically modified hydrocarbon waxes, and substituted amide waxes. The improvements in the present invention are most useful for incorporation into hydrocarbon and synthetically modified hydrocarbon waxes of the microcrystalline and the paraffin types. Such waxes, and in particular the microcrystalline varieties, are extensively utilized in the manufacture of water-resistant protective coatings applied to the surface of objects, structures, and tools used out of doors, e.g., automobiles, fiberglass boats, plastic and metal furniture, and wooden portions of homes. Considering the choice of wax in coatings, the microcrystalline waxes tend to have better durability than the paraffins owing to their greater plasticity, toughness, and higher melting range (60°–93° C. versus 46°–68° C.). These properties are largely attributable to the microcrystalline waxes having a larger number of carbon atoms per molecule (30–75 versus 20–36) and a higher average molecular weight (600–800 versus 350–420 Daltons) than the paraffins. Notwithstanding these properties, such wax coatings have a limited functional lifetime and must be periodically replaced.

Natural, synthetic, and mixed hydrocarbon waxes have been incorporated into many commercial products, and the prior art provides examples of chemical protectants incorporated into these products. For example, Yuma, JP. Pat. No. JP 05093164 A2 930416 Heisei, describes solid drawing materials in which UV light absorbers and hindered amines have been added to wax crayon compositions to stabilize the crayon color. Stone, PCT Int. Appl. WO 9419414 A1 940901, describes slip-resistant coatings containing mixtures of polymers and a petroleum or synthetic wax, together with a UV light absorber or an antioxidant, among other additives. Other references in the literature teach the addition of UV light absorbers and light scattering or blocking agents to waxes to protect underlying surfaces from UV damage.

Recently, several manufacturers of synthetic hydrocarbon waxes for automobiles have advertised the addition of UV light-blocking agents to a variety of wax emulsion coatings to protect the underlying automotive paint finish (and not the wax itself) from fading and other UV-induced damage. Applicants have developed a spectrophotometric test for the UV protection resulting from addition of these UV blocking agents. The test involves applying the test coating material (as recommended by the manufacturer) to a UV-transparent substrate to form a thin film coating of the product, and then obtaining a UV absorption spectrum using a scanning UV spectrophotometer. The thickness of the film is determined by accurate weight measurements before and after applying the coating. Testing two commercial automotive wax coatings in this manner on polymethylpentene thermoplastic UV-transparent substrate materials, Applicants have surprisingly discovered that when applied as recommended, the products provide very little UV-blocking activity (not more than 10% of the UV light between 300 and 400 nanometers wavelength is blocked). To be significantly effective, a UV-blocker in a coating should block at least 50% and preferably 90%+ of the incident UV light in the 325–350 nm wavelength range as measured through a coating applied as recommended by the manufacturer.

For the purpose of protecting the wax itself in an anti-graffiti wax coating from UV damage (rather than protecting an underlying surface), Black, in U.S. Pat. No. 5,387,434 has suggested addition of a UV blocker to the coating material. Black states, "Ultraviolet radiation breaks down the molecular bonds of the wax, thereby making the wax less water repellant. To avoid such UV breakdown, an appropriate UV blocker may be added."

Applicants have recently tested the UV-absorbing conjugated aromatic organic compounds named by Black as UV blockers (such as para-aminobenzoic acid), some of which are known to block UV light when mixed into aqueous oil-type emulsions for human skin care. Surprisingly, these compounds functioned inefficiently in absorbing UV light in the 325–350 nm range when mixed into the aqueous wax emulsions (or into the wax portion thereof) named by Black in U.S. Pat. No. 5,387,434. The wax emulsions which were tested included the PTGM 1303 microcrystalline wax emulsion product manufactured by Hercules, Inc., (Industrial Specialties Paper Technology Division, Wilmington, Del.). Applicants define photochemical stability for a UV stabilizer in a coating, as maintenance of at least 80% of the stabilizer's original UV absorbance over a period of one month in the coating when exposed to bright natural sunlight (5° South Florida), with the coating having an original optical density (including the UV stabilizer) of between 1.0 and 1.5 optical density units at a wavelength of 325 nm. For purposes of reference, the PTGM 1303 product is described by Hercules, Inc. as a stable wax emulsion based on refined microcrystalline wax, and typically used as a ceramic binder and as an anti-blocking and release agent, and to improve slip when applied to various substrates including paper, concrete forms. PTGM 1303 as commercially purchased, contains no UV stabilizers.

Failure of UV-absorbing agents (abbreviated UVAs) to achieve significant UV absorption in microcrystalline wax graffiti protectant coatings, and in automotive wax emulsions has now been traced by Applicants to the fact that the UVAs may be physically present but non-functional (not absorbing UV light) in the dried wax coatings. This is surprising because it is generally believed that UVAs "may be used so long as they are compatible with the wax emulsion and may be mixed in the water phase or the wax and then emulsified." (Black, U.S. Pat. No. 5,387,434). Consistent with this teaching, the Ciba-Geigy Corporation, one of the largest commercial suppliers of UVAs (Ciba Additives, Ciba-Geigy Corp., Hawthorne, N.Y.) has published an instructional brochure entitled "Additives for Coatings" dated 1993. The hydroxyphenyl benzotriazole-type UVA known as Tinuvin 1130 of Ciba-Geigy is recommended for such emulsions in this brochure because as a liquid, it "can be easily emulsified in water, which makes it especially suited for water-reducible and latex coatings". Tinuvin 1130 is further recommended in a detailed Ciba-Geigy technical document entitled "Tinuvin 1130 Liquid Ultraviolet Light Absorber for Coatings". In this product brochure it is stated, "Its unique structure allows it to disperse readily in emulsion-based waterborne coatings. Tinuvin 1130 migrates to the emulsion micelles and coats their exterior. This ensures molecular dispersity and thus optimal efficiency and performance." Despite these claims, Applicants have now shown that Tinuvin 1130 is essentially non-functional in water-reduced microcrystalline wax coatings. Applicants have discovered that the Ciba Geigy teaching on molecular dispersion may be relevant to emulsification of the UVA, but contrary to their suggestion, is not sufficient for performance of the UVA. More precisely, Ciba Geigy failed to teach the required molecular solubilization of the UVA in the residual non-liquid coating, i.e., wax, to achieve "performance," i.e., UV light absorption. Despite apparent emulsive dispersion of various UVAs including Tinuvin 1130 in commercial aqueous emulsion-type petroleum hydrocarbon waxes, very few UVAs which Applicants have tested from a variety of commercial sources are actually soluble in the residual wax phase. As a result, negligible to poor UV light absorption occurs in the waxes, and they are left unprotected, such as is the case with commercial automotive waxes containing Tinuvin 1130. Only empirical spectrophotometric testing of thin wax coatings (approximately 10 to 30 $\mu$ thick) prepared using different UVAs which are dispersed in hydrocarbon waxes and applied onto UV-transparent substrate surfaces, can reveal which UVAs are functional. See, Example 7. Similarly, the saturating concentration of a UVA must be measured in a wax by determining the concentration of the UVA, above which no incremental UV absorbance is detectable.

As explained above, Black in U.S. Pat. No. 5,387,434 has attempted to protect wax molecular structure and sustain water repellency by addition of certain aromatic organic compounds. While Black has suggested the alternative use of optically opaque sunscreens such as sodium silicate to protect waxes, the cloudy to white appearance of such sunscreens is undesirable in clearcoat applications. Applicants have also found that addition of the slightly water-soluble sodium silicate to a wax film can undesirably reduce the long term durability of the wax coating in outdoor use and de-stabilizes the wax emulsion over time for storage purposes.

Applicant has formulated a microcrystalline wax emulsion in which the wax phase contains verifiably dissolved UVA agents, free-radical and peroxy-radical scavengers (such as hindered amines) and antioxidants to retard degradation by light and air (oxygen). For the purposes of the present invention, degradation of a hydrocarbon wax coating is evidenced by the coating becoming a less effective barrier against graffiti through erosion of coating thickness, wax embrittlement, and cracking. When degradation of the wax is substantial, a penetration and failure of the barrier with graffiti paint application can occur. Loss of water repellency and yellowing of the wax may also be observed. One of the objectives of the present invention is to provide a wax coating which has enhanced graffiti paint resistance over time following outdoor exposure to sunlight and the other environmental elements.

A secondary benefit of this improvement in the wax as a graffiti barrier is that the wax can also provide a degree of protection for the underlying architectural surface against damage by the environmental elements, such as water and sun-related damage.

With regard to solid content in either the wax or the silicate-based coating material, the weight percentage of wax and/or silicate in the above-applied aqueous coating of material ranges from approximately 5% to 50%. Preferably, the weight percentage of wax and/or silicate in this coating of material ranges from approximately 10% to 20%. With a spread rate of approximately 350 $ft^2$ per gallon of coating, the resulting quantity of wax and/or silicate applied and deposited onto the surface and contained in the barrier coat ranges from approximately 1 $mg/cm^2$ to 3 $mg/cm^2$. With regard to mineral wax and/or synthetic wax-based coatings, for maintaining maximum resistance to graffiti penetration, and facilitating graffiti removal over time, the protective coating of material preferably includes at least three wax-protective chemical agents including a wax-soluble/water-insoluble UV light absorber, a wax-soluble/water-insoluble free-radical and peroxy-radical scavenger, and a wax-soluble/water-insoluble wax antioxidant.

The wax-soluble/water-insoluble free-radical and peroxy-radical scavenger is preferably selected from the group consisting of sterically hindered amines and aminoethers. The molecular structure of this scavenger preferably includes at least one piperidinyl moiety having at least two alkyl derivatized carbon atoms and/or carbon atoms derivatized with alkyl-terminated side chains. The molecular structure of this scavenger also preferably includes at least one piperidinyl moiety wherein the ring nitrogen is derivatized with an alkyl or alkyl-terminated side chain. This, as well as the previous molecular structure criterion are met by at least two hindered amine and aminoether compounds known as Tinuvin 292 and Tinuvin 123 manufactured by the Ciba-Geigy Corporation (Additives Division, Hawthorne, N.Y.)

The weight percentage of free-radical and peroxy-radical scavenger(s) in the dried barrier coat is preferably chosen to range between approximately 0.5% and 4.0%. This scavenger is preferably selected from the group consisting of bis-(1,2,2,6,6-pentamethyl-4-piperidinyl) sebacate, CAS No. 41556-26-7 (Tinuvin 292, Ciba-Geigy) and bis-(2,2,6,6-pentamethyl-4-piperidinyl) sebacate, CAS No.52829-07-0 (Tinuvin 770, Ciba-Geigy). Alternatively, this scavenger is an aminoether derivative such as bis-(1-octyloxy-2,2,6,6-tetramethyl-4-piperidinyl) sebacate, CAS No. 129757-67-1 (Tinuvin 123, Ciba-Geigy).

The protective UV light absorber can be selected from the group consisting of derivatized benzotriazole and derivatized benzophenone UV light absorbing molecules. The derivatized benzotriazole molecule is preferably selected from the group consisting of derivatized hydroxyphenylbenzotriazole UV light absorbing molecules as manufactured by the Ciba-Geigy Corporation. The derivatized hydroxy-phenyl moiety of this hydroxyphenylbenzotriazole molecule preferably includes at least two alkyl and/or alkyl-terminated side chains (such as Tinuvin 328 and Tinuvin 384 of the Ciba Geigy Corporation), providing solubility in hydrocarbon waxes and allowing UV absorption and energy transfer to occur in this molecular environment (see, Example 7).

The wax soluble/water insoluble UV light absorber is selected from the group consisting of 2-(2H-benzotriazol-2-yl)-4,6-bis(1,1-dimethylpropyl)phe nol, CAS No. 25973-55-5 (Tinuvin 328, Ciba-Geigy) and 2-[2-hydroxy-3-t-butyl-5-(2-octyloxycarbonyl)ethylpheny 1] 2H-benzotriazole, CAS No.127519-17-9 (Tinuvin 384, Ciba-Geigy). The weight percentage of UV light absorber in the dried barrier coat is chosen to range between approximately 0.1% and 3.0%. Preferably, the weight percentage of UV light absorber is between 1.0% and 2.0%.

The antioxidant protective chemical agent can be selected from the group consisting of sterically hindered phenol antioxidant molecules. The sterically hindered phenol molecules preferably include at least one derivatized phenol moiety having at least two alkyl and/or alkyl-terminated side chains providing solubility in hydrocarbon waxes. It is more preferred that the derivatized phenol moiety includes three alkyl and/or alkyl-terminated side chains providing solubility in hydrocarbon waxes. The weight percentage of antioxidant in the dried barrier coat is chosen to range between approximately 0.1% and 1.0%. Preferably the weight percentage of antioxidant is between 0.25% and 0.5%. The wax soluble/water insoluble wax antioxidant is preferably octadecyl 3,5-bis (1,1-dimethylethyl)-4-hydroxybenzene propanoate, CAS No. 2082-79-3 (Irganox 1076, Ciba-Geigy).

When the protective barrier coat includes a mineral wax it can be selected from the group consisting of microcrystalline, semimicrocrystalline, and paraffin hydrocarbon waxes. The mineral wax is preferably a microcrystalline hydrocarbon wax.

As indicated above, when the protective barrier coat includes a silicate, it can be selected from the group consisting of alkali metal silicates, e.g., sodium silicate and potassium silicate, precipitated silicic acid, and synthetic amorphous silica.

With anionic surfactants, the surfactant is selected from the group consisting of alkyl ester sulfates and alkyl ether sulfates. With alkyl ester sulfates, the surfactant is preferably sodium ethylhexyl sulfate [sulfuric acid, mono(2-ethylhexyl) ester] CAS No.126-92-1. Preferably, the weight percentage of anionic surfactant in the coating material ranges from approximately 0.25% to 0.75% by weight.

The surface being treated by the protective coating of material is selected from the group consisting of painted and unpainted, porous and non-porous, concrete, brick, stone, metal, wood and plastic surfaces.

The graffiti markings which are protected against, and which are removable from the protective coating of material described in the present invention, include graffiti applied using at least one marking medium selected from the group consisting of spray paint, permanent ink marker, pen, pencil, crayon and lipstick. The graffiti spray paint may include a permanent oil-based paint selected from the group consisting of enamels, epoxies, lacquers and urethanes.

Where soiling is concerned, this soiling may be derived from at least one source within the group consisting of air-borne soot, rain-carried contaminants, airborne radioactive particles, grease residues, human hand contact, shoe rubber contact and tire rubber contact.

The present invention also features a kit for minimizing graffiti damage and facilitating removal of paint or ink graffiti markings and soiling from a surface. The kit includes an improved material suitable for forming a protective barrier coat on the surface, the coating material being substantially free of toxic organic solvents and including water. The coating material includes at least one member selected from the group consisting of mineral waxes, synthetic waxes, and silicates, the member being present in the coating material in an amount sufficient to form a substantially adherent and continuous barrier against penetration by graffiti markings to an underlying surface. Where the improved coating material is used in forming wax-based barrier coats, it includes a practical and effective concentration of at least one wax-protective chemical agent selected from the group consisting of wax-soluble/water-insoluble UV light absorbers, wax-soluble/water-insoluble free-radical and peroxy-radical scavengers, and wax-soluble/water-insoluble wax antioxidants. Where the improved coating material is used in forming silicate-based barrier coats, it comprises a practical and effective concentration of an anionic or non-ionic surfactant which improves the adhesion, cohesion, and durability of the protective barrier coat. The surfactant is compatible with aqueous silicate emulsions. The kit also includes a solvent system for cleaning and maintaining, rather than sacrificing the protective barrier coat. The solvent system is applied to an area of the protective barrier coat being cleaned, and the solvent system includes a functionally effective concentration of at least one substantially non-toxic and low volatility organic solvent which can dissolve the graffiti markings and/or the soiling without substantially dissolving the protective barrier coat.

In the kit, it is preferred that the improved coating material for forming wax-based barrier coats includes at least three wax-protective chemical agents including a wax-soluble/water-insoluble UV light absorber, a wax-soluble/water-insoluble free-radical and peroxy-radical scavenger, and a wax-soluble/water-insoluble wax antioxidant. In the kit, it is also preferred that the improved coating material for forming silicate-based barrier coats includes an anionic surfactant selected from the group consisting of alkyl ester sulfates and alkyl ether sulfates. Regarding choice of solvents in the composition of the kit, a preferred organic solvent is 1-methyl-2-pyrrolidinone.

The following are non-limiting examples of the methods of the instant invention.

EXAMPLE 1

An oil-based enamel black paint was applied as graffiti and allowed to dry on the prior art wax coating of Black (see Example 4 of U.S. Pat. No. 5,387,434). The wax coating had been applied to a clear glass substrate to facilitate visual observations. MPD was diluted to various final concentrations (percentage by volume) using propylene glycol to determine the minimum effective concentration of MPD required to remove graffiti. Two drops of each solution were applied to the paint and allowed to sit ten minutes at room temperature (20° C.) before removal with a paper towel. The results were as follows, with the * symbol denoting rubbing action required to remove the amount of paint indicated:

| | Percentage MPD in propylene glycol | | | | | | |
|---|---|---|---|---|---|---|---|
| | 100 | 80 | 60 | 50 | 40 | 30 | 20 |
| Extent of removal | all | all | all | all | all* | 5%* | 0*% |

Observations and conclusions from this experiment were as follows: At least 30% by volume MPD must be present to allow rapid paint removal from the wax; propylene glycol appears to be a suitable diluent for MPD; the wax coating is not attacked by either MPD or propylene glycol; the higher percentages of MPD tended to dissolve paint faster while not harming the wax coating; either wiping or water rinsing (with low pressure ambient temperature water from a hose) removed the paint and spared the wax. As a result, the wax coatings previously described by Black in U.S. Pat. No. 5,387,434 as sacrificial and removed with the graffiti by heated water under high pressure, need not be sacrificed when an appropriate cleaning agent which spares the graffiti barrier is used.

EXAMPLE 2

A commercial paint remover ("Piranha I") produced by Fiberlock Technologies, Inc. (Cambridge, Mass.) is formulated to rapidly remove multiple coats of lead based paint. The Piranha paint removal product contains 50–60% by volume MPD, and approximately 40–50% by volume of several dicarboxylic acid derivatives including dimethyl glutarate, dimethyl adipate, and dimethyl succinate. It was tested on the graffiti on wax coatings of Example 1 using the same procedure. All of the graffiti was removed without harming the wax coating. Therefore, diluents other than propylene glycol (such as those in this example, as well as ethylene glycol) can be used with MPD, and allow graffiti removal while sparing the wax graffiti barrier. In contrast to the propylene carbonate-containing composition of Leys which damaged and removed the wax coatings, this Piranha product contained no propylene carbonate.

EXAMPLE 3

As in Example 1, black paint was applied as graffiti to a sodium silicate anti-graffiti coating (prepared as described in Example 1 of U.S. Pat. No. 5,387,434) and allowed to dry. Again, MPD was diluted to various final concentrations (percentage by volume) using propylene glycol to determine the minimum effective concentration of MPD required to remove graffiti. Two drops of each solution were applied to the paint and allowed to sit ten minutes at room temperature (20° C.) before removal by wiping with a paper towel. The results were as follows:

| | Percentage MPD in propylene glycol | | | | | | |
|---|---|---|---|---|---|---|---|
| | 100 | 80 | 60 | 50 | 40 | 30 | 20 |
| Extent of removal | all | all | all | all | all | all | 0% |

Observations and conclusions from this experiment were as follows: At least 30% by volume MPD must be present to allow rapid paint removal from the silicate; propylene glycol appears to be a suitable diluent for MPD; the silicate coating is not attacked by either MPD or propylene glycol; high percentages of MPD did not harm the silicate coating; Wiping with a paper towel or cloth rag removed the paint and spared the sodium silicate.

EXAMPLE 4

A porous brick was treated with the microcrystalline wax aqueous emulsion coating used in Example 1. After the coating had dried it was sprayed with black paint graffiti as in Example 1. After the paint had dried, the efficacy of paint removal using MPD diluted with either water or propylene glycol was tested. The solutions of MPD were allowed 10 minutes contact time with the paint before being removed with a paper towel. Extent of paint removal was judged following wiping with a paper towel.

| | Percentage MPD in water | | | |
|---|---|---|---|---|
| | 100 | 50 | 40 | 30 |
| Paint removal | all | 20% | 10% | 0% |

| | Percentage MPD in propylene glycol | | | | |
|---|---|---|---|---|---|
| | 100 | 50 | 40 | 30 | 20 |
| Paint removal | all | all | 10% | 0% | 0% |

The observations and conclusions were as follows: The areas in which paint had been removed were examined visually and by water repellency for the persistence of the microcrystalline wax coating. The results were positive in all cases indicating that MPD does not remove the wax coating using either propylene glycol or water as a diluent. Water and propylene glycol were not comparable as diluents or extenders for MPD in removing paint applied to wax barriers. While 50% by volume MPD in propylene glycol was completely effective in removing all paint, the same dilution of MPD in water was essentially ineffective (20% paint removal). Therefore, for paint removal from the wax barriers, propylene glycol is preferred over water.

EXAMPLE 5

A porous brick was treated with the sodium silicate coating used in Example 3 as described in Example 1 of U.S. Pat. No. 5,387,434. After the coating had dried it was sprayed with black paint graffiti as in Example 1 above. After the paint had dried, the efficacy of paint removal using MPD diluted with either water or propylene glycol was tested. The solutions of MPD were allowed 10 minutes contact time with the paint before being removed with a paper towel. Extent of paint removal was judged following wiping with a paper towel.

| | Percentage MPD in water | | | |
|---|---|---|---|---|
| | 100 | 50 | 40 | 30 |
| Paint removal | all | all | all | 0% |

| | Percentage MPD in propylene glycol | | | | |
|---|---|---|---|---|---|
| | 100 | 50 | 40 | 30 | 20 |
| Paint removal | all | all | 90% | 0% | 0% |

The observations and conclusions were as follows: The areas in which paint had been removed were examined visually for the persistence of the sodium silicate coating. The results were positive in all cases indicating that MPD does not remove sodium silicate using either propylene glycol or water as a diluent. Water and propylene glycol were comparable as diluents or extenders for MPD in removing paint applied to sodium silicate barriers. 40% by volume MPD in each diluent removed essentially all of the paint.

EXAMPLE 6

Compositions are described and their use, by which typical graffiti (oil-based paint graffiti and/or permanent marking ink graffiti) can be removed from the wax and/or sodium silicate graffiti barriers of Black (described in U.S. Pat. No. 5,387,434) without removing these barriers.

| Ingredient* | Concentration Range (by weight) | Preferred Range (by weight) |
|---|---|---|
| 1-methyl-2-pyrrolidinone | 20%–99+% | 40%–60% |
| hydroxypropylcellulose (thickener, e.g., Klucel ® H) | 0.25%–3% | 0.5%–2% |
| propylene glycol (diluent) (optional use of co-solvent, e.g., limonene, as portion of diluent) | 80%–0% | 58%–36% |
| octoxynol (non-ionic detergent, e.g., Triton X-100) | 0%–2% | 1%–2% |

*MPD (1-methyl-2-pyrrolidinone), the active solvent for the graffiti was obtained from the GAF Corp. (Wayne, NJ). The selection of a thickening agent which is soluble in both the MPD and the chosen diluent, serves to increase the amount of MPD which can be applied to a given area, and the length of time it will remain on the area being cleaned before it flows away. Hydroxypropylcellulose in the form of a dry powder (Klucel ® H) is soluble in this system and was obtained from the Aqualon Division of Hercules Inc. (Wilmington, DE).

A diluent is selected which can serve as a volume extender for MPD, and which is preferably inexpensive and low in toxicity or non-toxic, while not inhibiting the action of the MPD. Propylene glycol serves this purpose. Alternative diluents for MPD include other low volatile organic compound solvents (low VOC solvents) such as other glycol derivative solvents, e.g., ethylene glycol which does not dissolve sodium silicate or the hydrocarbon waxes found in the graffiti barriers of Black.

A co-solvent for graffiti may also be included in the diluent component, provided that it is compatible and mixable with MPD and the diluent. For example, the co-solvent, limonene, CAS No. 5989-27-5, a terpene extracted from lemon and orange peel (obtained from Florida Chemical, Lakeland, Fla.), when mixed with MPD and a diluent such as propylene glycol, accelerates graffiti removal. Limonene can be used as the entire diluent if so desired in combination with MPD for graffiti removal from the sodium silicate barriers of Black. However with the microcrystalline wax barriers of Black, pure limonene slowly dissolves the barrier. Nevertheless, when used as only a portion of the diluent in combination with MPD, the limonene is beneficial in accelerating graffiti removal. For example, a combination of 50% by weight MPD, 25% by weight propylene glycol and 25% by weight limonene, removes graffiti from the wax barriers of Black more rapidly than a 50% MPD and 50% propylene glycol combination. Neither combination damages the wax barrier.

A non-ionic detergent such as Triton X-100 which is soluble in this solvent system can be added to improve the surface wetting properties of the mixture. Although not required for the paint-removing activity of this mixture, the detergent is particularly helpful in spreading and adhesion of the mixture on smooth and gloss surfaces.

A graffiti removal composition which included 50% by weight MPD, 1k by weight Klucel® H, 48% by weight propylene glycol was applied to the graffiti (black enamel, oil paint graffiti)—coated wax and sodium silicate-protected surfaces of Black (U.S. Pat. No. 5,387,434). After approximately 10 minutes, the graffiti paint and residues of the treatment composition were removed by: (I) washing away with low pressure water from a garden hose, (ii) high pressure cold water washing, or (iii) wiping off the material with a rag. The length of time necessary to effect an adequate graffiti removal varies with the ambient temperature, the number of coats and age of the graffiti, and its paint type.

The preferred method of removing the treated graffiti depends upon the underlying architectural surface sealed with the wax and/or sodium silicate coatings. If it is rough, such as cinder block or coarse-surfaced stone, power washing is preferred. If the surface is flat, such as metal, wood, plaster, and the like, low pressure washing or the rag method can be used.

EXAMPLE 7

Representative compositions are described for establishing UV-protection and oxidative stability in the wax coatings described in this invention. A combination of a wax-soluble/water-insoluble UV-absorber (i.e., UVA), plus a hindered amine light stabilizer (i.e., a HALS agent) and an antioxidant (i.e., an AO) are incorporated into an aqueous wax emulsion (e.g., into the G PRO® formulation described above) for effective protection against the outdoor environment. The solubility of the UVA, HALS, and AO in the wax phase and not in water is critical for the effectiveness of these agents. The ratio of UVA to HALS ranges between approximately 0.5:1 to 2:1 depending upon the particular requirements of the protective coating. This combining of agents is important because they act synergistically to protect the wax coating as well as the underlying surface. The UVA blocks incident UV light and thereby protects both the coating and the underlying surface while the HALS (and AO) help scavenge chemical free radicals within the coating to prevent embrittlement, loss of water repellency, yellowing, and other degradation of the wax coating. The effectiveness of the UVA is dependent upon the agent being chemically stable as well as remaining soluble in the microcrystalline wax component of G PRO® formulation and not in water, and its actual UV absorption spectrum in the final "cured" coating between the wavelengths of 300 and 400 nm. The UVA, a benzotriazole known as Tinuvin 328 (Ciba-Geigy) has a strong and broad UV absorption spectrum in the dried G PRO® wax coating over the above wavelength range. This UVA agent, commercially available as a dry powder, is readily dissolved in the molten microcrystalline wax component of G PRO® formulation. By contrast, a formerly utilized UVA (Tinuvin 1130) is essentially insoluble in the same wax and provides negligible UV absorption in the cured coating (see below). In addition to the UVA, Tinuvin 292 (Ciba-Geigy) as the HALS agent, and Irganox 1076 (Ciba-Geigy) as the AO agent are both readily dissolved in the molten wax component of G PRO® formulation. A preferred formulation for the G PRO® product contains 2% Tinuvin 328, 2% Tinuvin 292 and 0.25–0.5% Irganox 1076. The following test system was used to quantitate UV light absorption in the G PRO® wax coating:

Coating Mixture:

A known quantity of the microcrystalline wax (0.500 gram) was melted in a boiling water bath at 100° C. and combined with either 1% or 2% by weight of the UVA (Tinuvin 328 or Tinuvin 1130) plus 2% by weight of Tinuvin 292 and 0.25% by weight Tinuvin 1076. Each mixture was vortex-blended before applying to the substrate.

Substrate:

UV-transparent polymethylpentene (also known as TPX) plastic sheets 5 mils thick (which had been lightly abraded using a steel wool pad to allow adhesion of the coating).

Application Density:

A gallon of G PRO® product containing 15% by weight of wax covers up to 350 $ft^2$ of surface area. 15% of approximately 3800 g/gal=570 g wax on 350 $ft^2 \times 929$ $cm^2/ft^2$ or 325,150 $cm^2$ of area. This application density translates to 1.75 mg wax per $cm^2$ and if the dried coating has a density of 0.9 gm/cm$^3$, then a 1.8 mg/cm$^2$ coating has a thickness of approximately 20 microns or 0.0008 inches. A slight excess of the wax was applied to the substrate using a pre-heated glass pipette, and the coating was allowed to cool and solidify. The coating was smoothed and buffed in one direction using the face and edge of a stainless steel spatula until a uniform thickness of wax was obtained.

Coating Weight and Thickness:

The UV-transparent plastic film substrate was weighed on an analytical balance both before and after applying the wax coating. The net weight of the coating divided by the measured area of the coating yields the application coating density. This number was found to be between 1.3 and 1.8 mg per cm$^2$ for the samples measured. The coating thickness was also measured by micrometer at the point on the plastic film where the spectral light beam passed through the film.

Figure 2:
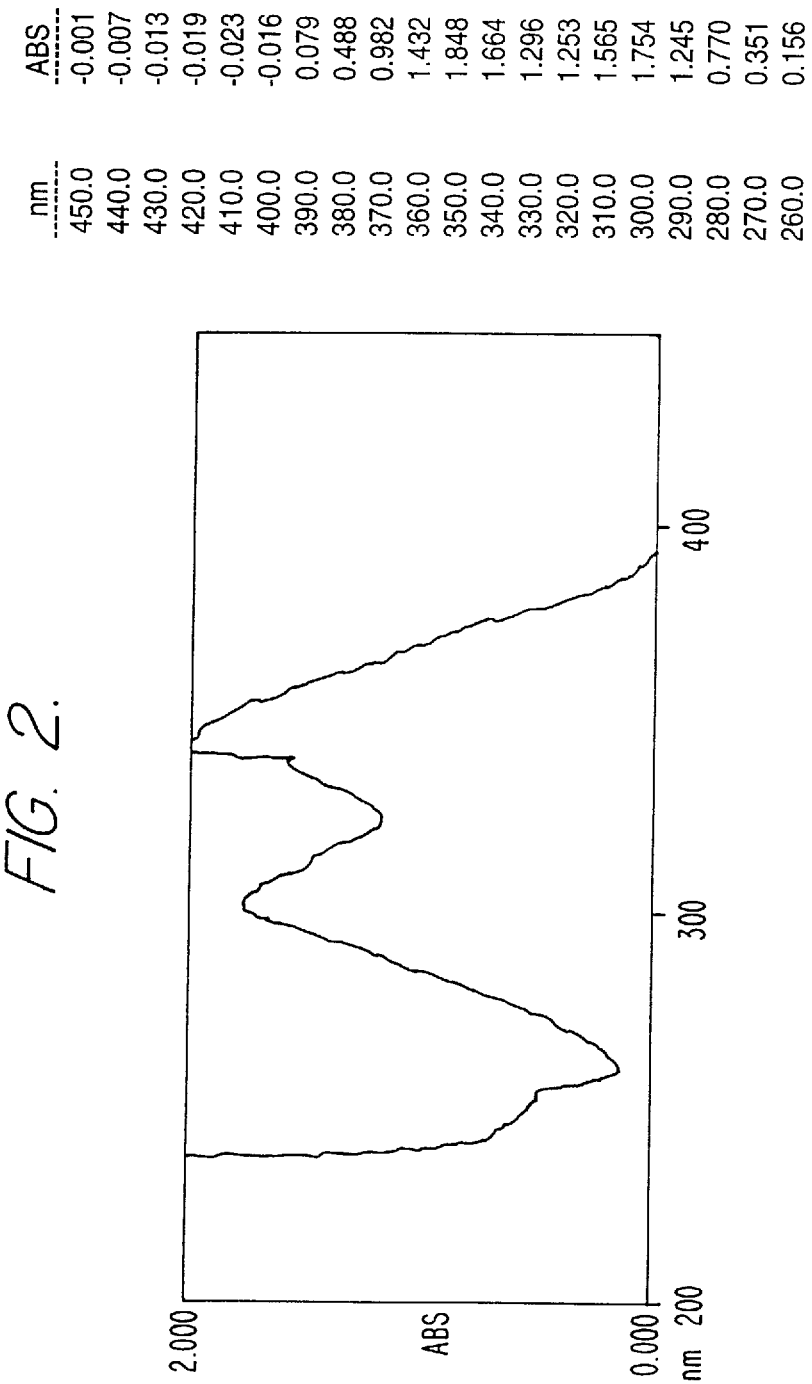
FIG. 2: Same as FIG. 1 except the coating was 16 microns thick and contained 2% by weight Tinuvin 328.
Figure 3:
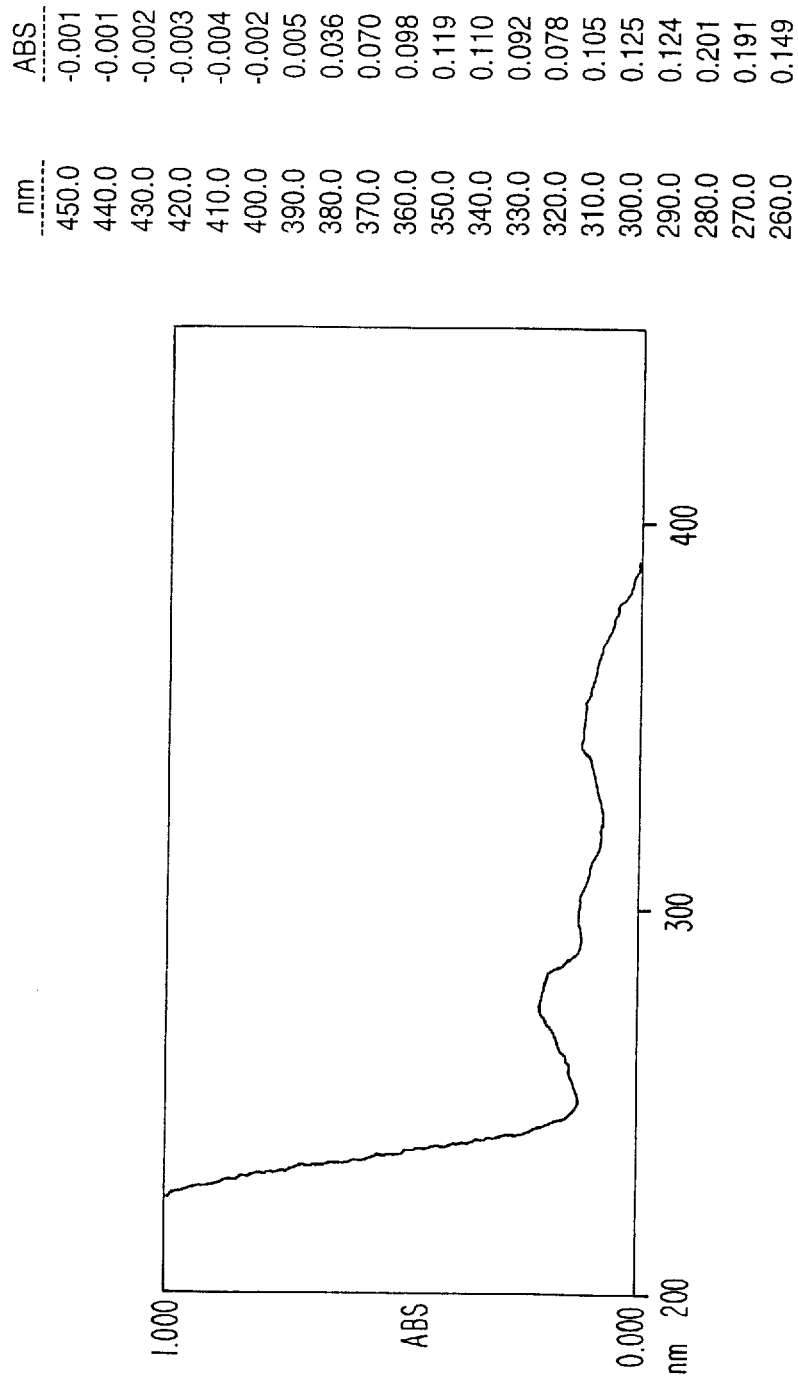
FIG. 3: Same as FIG. 2 except the coating was 18 microns thick and contained 2% by weight Tinuvin 1130. Analytical Comments: Tinuvin 328 is performing at or near its theoretical optimum. With a molecular weight of 351 and a molar extinction coefficient of approximately 16,000 at the 350 nm wavelength, a 20 micron thick film containing 2% by weight of the Tinuvin 328 should have an OD at 350 nm of 1.80 by the Beer's Law calculation of OD=E·l·c. Conversely by comparison, it is apparent that Tinuvin 1130 is absorbing UV light inefficiently probably due to a limited solubility in microcrystalline wax.

Spectral Scans:

A double beam Hitachi scanning spectrophotometer was utilized for generating the UV spectra. TPX plastic film swatches which had been coated with the wax samples were placed in the sample beam while swatches which were similarly coated with the unmodified microcrystalline wax were placed in the reference beam of the instrument. The spectrophotometer was programmed to scan from 450 nm to 200 nm with a full scale deflection of either OD 1.0 or 2.0. Three spectral scans are described herein and presented as FIGS. 1, 2, and 3 respectively.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

We claim:

1. A method of treating surfaces to increase resistance of said surfaces to graffiti markings and other soiling, and facilitating cleaning of said surfaces, said method comprising the steps of:

applying a coating material to a surface to form thereon a barrier coat, wherein said coating material comprises water and at least one constituent selected from the group consisting of mineral waxes and synthetic waxes, wherein said coating material includes an effective concentration of at least one wax-protective chemical agent selected from the group consisting of photostable wax-soluble/water-insoluble solar UV light absorbers, wax-soluble/water-insoluble free-radical and peroxy-radical scavengers, and wax-soluble/water-insoluble antioxidants.

2. The method of claim 1 wherein said dried barrier coat comprises at least three wax-protective chemical agents including a photostable wax-soluble/water-insoluble solar UV light absorber, a wax-soluble/water-insoluble free-radical and peroxy-radical scavenger, and a wax-soluble/water-insoluble antioxidant.

3. The method of claim 1 wherein said wax-soluble/water-insoluble free-radical and peroxy-radical scavenger in said dried barrier coat is selected from the group consisting of sterically hindered amines and aminoethers.

4. The method of claim 3 wherein the molecular structure of said scavenger includes at least one piperidinyl moiety having at least two alkyl derivatized carbon atoms and/or carbon atoms derivatized with alkyl-terminated side chains.

5. The method of claim 3 wherein the molecular structure of said scavenger includes at least one piperidinyl moiety wherein the ring nitrogen is derivatized with an alkyl or alkyl-terminated side chain.

6. The method of claim 3 wherein said free-radical and peroxy-radical scavenger is selected from the group consisting of bis-(1,2,2,6,6-pentamethyl-4-piperidinyl) sebacate, CAS No. 41556-26-7, bis-(2,2,6,6-pentamethyl-4-piperidinyl) sebacate, CAS No.52829-07-0 and bis-(1-octyloxy-2,2,6,6-tetramethyl-4-piperidinyl) sebacate, CAS No. 129757-67-1.

7. The method of claim 1 wherein said photostable wax-soluble/water-insoluble solar UV light absorber in said dried barrier coat is selected from the group consisting of derivatized benzotriazole and derivatized benzophenone UV light absorbing molecules, wherein the derivatization is with substituents providing solubility in said wax constituent.

8. The method of claim 7 wherein said derivatized benzotriazole UV light absorbing molecules are derivatized hydroxy-phenylbenzotriazole UV light absorbing molecules.

9. The method of claim 8 wherein the derivatized hydroxy-phenyl moiety of said hydroxy-phenylbenzotriazole molecules preferably includes at least two alkyl and/or alkyl-terminated side chains providing solubility in hydrocarbon waxes.

10. The method of claim 8 wherein said derivatized hydroxy-phenylbenzotriazole UV light absorbing molecules are selected from the group consisting of 2-(2H-benzotriazol-2-yl)-4,6-bis(1,1-dimethylpropyl)phenol, CAS No. 25973-55-5 and 2-[2-hydroxy-3-t-butyl-5-(2-octyloxycarbonyl)ethylpheny 1] 2H-benzotriazole, CAS No.127519-17-9.

11. The method of claim 1 wherein said wax-soluble/water-insoluble antioxidant in said coating material is a sterically hindered phenol molecule.

12. The method of claim 11 wherein said sterically hindered phenol molecule includes at least one derivatized phenol moiety having at least two alkyl and/or alkyl-terminated side chains providing solubility in hydrocarbon waxes.

13. The method of claim 11 wherein said sterically hindered phenol molecule includes at least one derivatized phenol moiety having three alkyl and/or alkyl-terminated side chains providing solubility in hydrocarbon waxes.

14. The method of claim 11 wherein said wax soluble/water insoluble antioxidant is Octadecyl 3,5-bis (1,1-dimethylethyl)-4-hydroxybenzene propanoate, CAS No. 2082-79-3.

15. The method of claim 1 wherein said mineral wax it is selected from the group consisting of microcrystalline, semimicrocrystalline, and paraffin hydrocarbon waxes.

16. The method of claim 1 wherein said mineral wax is a microcrystalline hydrocarbon wax.

17. The method of claim 1 wherein said cleaning is by a process selected from the group consisting of: heated, pressurized water cleaning and an organic solvent based cleaning.

18. The method of claim 17 wherein said organic solvent based cleaning comprises an organic solvent selected from the group consisting of 1-methyl-2-pyrrolidinone (MPD) and 2-pyrrolidinone.

* * * * *